United States Patent
Doss et al.

(10) Patent No.: US 6,731,323 B2
(45) Date of Patent: May 4, 2004

(54) MEDIA-ENHANCED GREETINGS AND/OR RESPONSES IN COMMUNICATION SYSTEMS

(75) Inventors: J. Smith Doss, Raleigh, NC (US); John R. Hind, Raleigh, NC (US); Renee M. Kovales, Cary, NC (US); James M. Mathewson, II, Chapel Hill, NC (US); Diane P. Pozefsky, Chapel Hill, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/119,519

(22) Filed: Apr. 10, 2002

(65) Prior Publication Data

US 2003/0193558 A1 Oct. 16, 2003

(51) Int. Cl.[7] .................................................. H04N 7/14
(52) U.S. Cl. ................................ 348/14.01; 379/93.24; 379/88.17
(58) Field of Search .......................... 379/93.24, 93.23, 379/90.01, 88.13, 88.17; 709/206; 348/14.01–14.09, 14.1, 14.11, 14.13

(56) References Cited

U.S. PATENT DOCUMENTS

| | | | |
|---|---|---|---|
| 5,428,784 A | * | 6/1995 | Cahill, Jr. .................... 709/206 |
| 5,835,130 A | * | 11/1998 | Read et al. ............... 348/14.01 |
| 6,226,362 B1 | | 5/2001 | Gerszberg et al. |
| 6,282,565 B1 | * | 8/2001 | Shaw et al. .................. 709/206 |
| 6,501,834 B1 | * | 12/2002 | Milewski et al. ......... 379/93.24 |
| 2001/0036839 A1 | | 11/2001 | Tsai |
| 2002/0023131 A1 | * | 2/2002 | Wu et al. .................... 709/205 |
| 2002/0090069 A1 | * | 7/2002 | Yaker ........................ 379/88.17 |
| 2002/0091777 A1 | * | 7/2002 | Schwartz .................... 709/206 |

FOREIGN PATENT DOCUMENTS

| | | | | |
|---|---|---|---|---|
| AU | 8778930 A | * | 3/1988 | ............ H04M/1/00 |
| EP | 1091548 A2 | * | 4/2001 | .......... H04M/3/428 |
| GB | 2318251 A | * | 4/1998 | ............ H04M/3/42 |

OTHER PUBLICATIONS

IBM Technical Disclosure Bulletin, "Communications Enhancements Made Possible by Caller–ID", Oct., 1994, pp. 27–30.

* cited by examiner

*Primary Examiner*—Melur Ramakrishnaiah
(74) *Attorney, Agent, or Firm*—Jerry W. Herndon; Marcia L. Doubet

(57) ABSTRACT

Methods, systems, computer program products, and methods of doing business by using various types of media to enhance greetings and/or responses provided to users of communication systems, for example by providing music or sound for a telephone caller, or video or image for a video phone caller, or any of these types of media or an executable program for a message sender who is using an e-mail system or an instant messaging system. In preferred embodiments, information from an intended message recipient's calendar (and/or context) is used when selecting the media to enhance a greeting/response, thereby providing contextual information for the message sender. In alternative embodiments, the selection is based on one or more factors such as information stored in user profiles. The disclosed techniques enable alleviating some of the problems that result from distance communication (as contrasted to face-to-face communication), and may also make distance communication more enjoyable and/or more productive. Adaptations are also disclosed for a calling-party scenario.

33 Claims, 13 Drawing Sheets

FIG. 5

| Phone Number | User ID | start time | end time | sound ID | video file ID | icon id |
|---|---|---|---|---|---|---|
| 555-444-3333 | jdoe@myco.com | 12/21/01 09:00 | 12/21/01 10:00 | 21 | 1065 | 2901 |
| 555-444-3333 | jdoe@myco.com | 12/21/01 10:00 | 12/21/01 17:00 | 77 | 1057 | 2217 |
| 555-444-3333 | jdeo@myco.com | 12/21/01 17:00 | 01/02/02 08:00 | 236 | 1872 | 2003 |
| 917-867-5309 | jenny | 12/01/01 00:00 | 01/01/02 23:59 | 964 | 1000 | 2117 |

| 600 | | | | | | | |
|---|---|---|---|---|---|---|---|
| Phone Number | User ID | start time | end time | sound ID | video file ID | icon id | status |
| 555-444-3333 | jdoe@myco.com | 12/21/01 09:00 | 12/21/01 10:00 | 21 | 1065 | 2901 | teleconference |
| 555-444-3333 | jdoe@myco.com | 12/21/01 10:00 | 12/21/01 17:00 | 77 | 1057 | 2217 | free time in office |
| 555-444-3333 | jdeo@myco.com | 12/21/01 17:00 | 01/02/02 08:00 | 236 | 1872 | 2003 | out of office |
| 917-867-5309 | jenny | 12/01/01 00:00 | 01/01/02 23:59 | 964 | 1000 | 2117 | no status |

| Media file ID | Media file title |
|---|---|
| 21 | office sounds |
| 77 | Jazz- general |
| 236 | "I'll be home for Christmas" |
| 964 | Sleigh bells |
| 1057 | Harry Connick Jr. jazz video |
| 2003 | Smiley face |

| Media file ID | Media file location |
|---|---|
| 1 | <no sound> |
| 21 | /usr/sounds/office21.wav |
| 77 | /usr/sounds/jazz/jazz1.wav |
| 236 | /usr/sounds/jazz/jazz2.wav |
| 964 | /usr/sounds/xmas/home_for_xmas.mid |
| 893 | /usr/sounds/bells.mid |
| | 101.5 FM |

*710*  *760*

MEDIA-ENHANCED GREETINGS AND/OR RESPONSES IN COMMUNICATION SYSTEMS

BACKGROUND OF THE INVENTION

1. Field of the Invention

The present invention relates to communication systems, and deals more particularly with methods, systems, computer program products, and methods of doing business by using various types of media to enhance greetings and/or responses provided to users of these communication systems, for example by providing music or sound for a telephone caller to hear, or video or image for a video phone caller to view, or icons to be displayed to a message sender who is using an instant messaging system or e-mail.

2. Description of the Related Art

Face-to-face communication between people involves many parallel communication paths. We derive information from body language, from words, from intonation, from facial expressions, from the distance between our bodies, and so forth. Distance communication, such as phone calls, voice mail, e-mail, or exchanging instant mail messages, on the other hand, involves only a few of these communication paths. Users may therefore have to take extra actions (which may or may not be successful) if they wish to try to overcome the limitations so imposed.

Distance communicating is becoming more prevalent in our society. Voice mail systems have become widely used in recent years, with most people having voice mail capability on their office phones and some type of answering machine capability or system for their home phones and mobile phones. Video phones are not as widely used as conventional telephones, but when a caller and called party connect using video phones, the communications that result from this type of phone conversation will be greatly enhanced and will go a long way in making up for the disadvantages imposed by physical distance. E-mail is used by millions of people around the world as a means of distance communicating.

Instant messaging systems are a popular communications mechanism for many people, and provide for instant, real-time communication between users who are connected to the system through an on-line or electronic networking environment such as the Internet, World Wide Web (hereinafter, "Web"), or corporate internal intranets. Examples of instant messaging systems include Yahoo!® Messenger, AOL Instant Messenger℠, and Sametime®. ("Yahoo!" is a registered trademark of Yahoo! Inc., "AOL Instant Messenger" is a service mark of America Online, Inc., and "Sametime" is a registered trademark of Lotus Development Corporation.)

Instant messaging systems provide real-time awareness of who is logged on. Typically, an instant messaging system (hereinafter, "IMS") user has an address book or "buddy list" containing names or nicknames for those people with whom he communicates. The entries in this address book are used for selecting a message recipient. The IMS typically indicates, using a visual cue (such as different icons or different fonts), which of the people are logged on to the system and which are not. When the message sender and the target recipient are both currently logged on to an IMS (which may be the same IMS, or a different IMS), the message can be delivered and presented to the recipient nearly instantly (depending on network delay). Instant messaging systems are well known in the art, and a detailed description thereof is not deemed necessary to an understanding of the present invention.

In spite of the increasing prevalence of distance communications, or perhaps because of it, people who want to contact someone who happens to be unavailable are often frustrated and unhappy with their communications experience. Many people who communicate by telephone, for example, are annoyed when they reach the called party's voice mail system or answering machine. Often, they choose not to leave any message at all, preferring instead to try again later to "reach a human being". In addition to causing user frustration, this situation is also time consuming and unproductive. Furthermore, voice mail messages often provide very little useful information for the caller.

Accordingly, there is a need for techniques that provide more enjoyable and more productive ways for people to communicate and to exchange messages, where these techniques may also alleviate some of the disadvantages in distance communications.

SUMMARY OF THE INVENTION

An object of the present invention is to provide more enjoyable and more productive ways for people to communicate and/or to exchange messages.

Another object of the present invention is to provide ways of alleviating some of the disadvantages in distance communications.

Yet another object of the present invention is to define techniques for enhancing greetings and/or responses in communication systems using various types of media.

A further object of the present invention is to enhance greetings and/or responses by adding contextual information (which preferably pertains to the intended message recipient).

Still another object of the present invention is to define techniques for using stored calendar information of a message recipient to enhance that recipient's automated greetings to message senders.

A further object of the present invention is to provide techniques for allowing message recipients to customize the automated enhancement of their greetings.

Yet another object of the present invention is to provide new methods of doing business whereby media files to be used with (or instead of) greetings and/or responses can be merchandised to consumers.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, in a first aspect the present invention provides methods, systems, computer program products, and methods of doing business by enhancing greetings used in communication systems. In this first aspect, this technique preferably comprises: receiving, from a message initiator, an incoming message for an intended message recipient, where the intended message recipient does not answer the incoming message; programmatically selecting a media file to be incorporated with the intended message recipient's greeting for rendering to a message initiator, wherein the selected media file conveys contextual information pertaining to the intended recipient; and rendering the selected media file and greeting to the message initiator. This aspect may further comprise programmatically consulting the intended message recipient's electronic calendar to determine his current status, and wherein the selected media file is selected to correspond to the current status. The selected media file might be rendered before or after rendering the greeting, as a replacement for the greeting, or mixed with the greeting as background.

The message exchange may be an e-mail message exchange, and the greeting may be an e-mail response message or an instant message generated by an automated function, in which case the technique preferably comprises: receiving, from the message initiator, an incoming e-mail message for the intended message recipient when the automated function is activated for generating the response message for the intended message recipient's incoming e-mail messages; programmatically determining the selected media file to be incorporated with the generated response message; and returning the selected media file and generated response message to the message initiator.

In a second aspect, this technique comprises enhancing a message exchange during a temporary suspension in the exchange, by rendering a media file that has been programmatically selected to convey contextual information pertaining to a party to the exchange.

The techniques disclosed herein may also be used advantageously to provide new methods of doing business. As one example, prerecorded media files to be used in greeting enhancements may be merchandised to companies and/or individuals. As another example, the improved communication systems that result from incorporating the techniques of the present invention can be offered to customers as a value-add service (e.g., of a telephone company or Internet service provider). Merchandising the media files preferably further comprises: receiving requests for selected ones of the pre-recorded media files for incorporating with greetings to be rendered for message initiators to convey contextual information pertaining to an intended recipient of the message; and providing the selected ones, in response to receiving the requests. The message initiators may be callers using telephones, callers using video phones, or message senders using e-mail or instant messaging systems. A subscription, a one-time charge, or a pay-per-use model is preferably used to charge for the merchandised media files.

The techniques of the present invention may also be adapted to convey contextual information pertaining to the message initiator. In this optional adaptation, the present invention preferably comprises: initiating, by the message initiator, an inbound message for the message recipient, where the message recipient does not answer the inbound message; programmatically selecting the media file to be incorporated with the message initiator's message, based on the contextual information (which may, for example, be obtained from the message initiator's electronic calendar or other context); and rendering the selected media file along with, or as, the message initiator's message for the message recipient.

The present invention will now be described with reference to the following drawings, in which like reference numbers denote the same element throughout.

DESCRIPTION OF THE DRAWINGS

FIG. 5 shows a sample table containing information that may be used with embodiments of the present invention to select an appropriate media file;

FIG. 6 shows a sample table that is similar to that of FIG. 5, but is augmented with status information about users who may receive incoming messages;

FIGS. 7A and 7B provide sample tables that may be used with embodiments of the present invention, where these tables show a correlation between an identifier ("ID") of a media file (or group of files) and a descriptive title thereof, and a correlation between the ID and the location(s) of the identified media file(s), respectively;

DESCRIPTION OF PREFERRED EMBODIMENTS

Figure 1A:
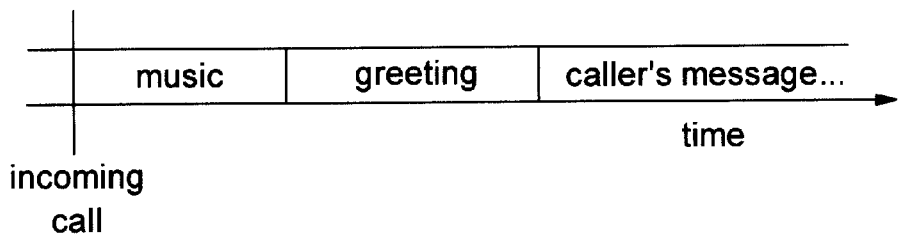
FIGS. 1A–1D are timelines illustrating use of media to enhance a message exchange process, according to preferred embodiments of the present invention.

The present invention defines techniques for providing more enjoyable and more productive ways for people to communicate and to exchange messages. The disclosed techniques also alleviate some of the disadvantages in distance communications. Various types of media files may be used, according to embodiments of the present invention, to enhance automated greetings/responses in communication systems. These enhancements allow the message sender to receive contextual information about the message recipient. The added meaning provided by the contextual information preferably informs the message sender as to the type of event in which the intended message recipient is currently engaged without having to tell the message sender directly. Use of the disclosed techniques also adds "pizzazz" to ordinary greetings (such as those provided by voice mail or telephone answering systems), and personalizes greetings in an automated fashion.

Embodiments of the present invention may be used with various types of communication systems. These various types include—but are not limited to—telephone voice mail systems, telephone answering systems (including answering systems provided with an individual telephone), traditional video phones, video phones used with computer-based communications (such as Web-cam systems, which typically include video and audio capability), e-mail systems, and instant messaging systems. (The term "message" is used herein to refer to communications using these various types of systems, including telephone calls.) A number of different types of media files may be used. Examples will now be described. Music clips or sound files may be used with the telephone systems. Video clips or still images may be used with the video systems; music or sound files may also be used with these systems. Other file types that may be used with video systems include home movies, taped or currently-running television programs, computer-generated designs, live video feed from a camera at another location, music videos, webcasts, and so forth. Audible or visual files of different forms, such as ".wav" audible files, may be used with e-mail systems; other types of files might be used with e-mail as well, including executable programs, text, icons, links to locations or web pages, watermarks, etc. Icons or graphic files may be used with IMS-based communications. And, the sound from a visual media source might be used as an audible media source.

The media files may be prerecorded and available from the calling (initiating) party's system or device, from the called (receiving) party's system or device, or from the service provider. Or, the files may be downloaded on demand, e.g., by issuing a request to a Uniform Resource Locator ("URL") of a target file. When used with systems/devices having appropriate hardware, the media files may be computer-generated.

Hereinafter, the words "music", "song", and "sound" are used interchangeably to refer to audible media; the words "video" and "image" are used interchangeably to refer to visual media; and the words "icon" or "graphic" are used interchangeably as examples to refer to media types which are appropriate for IMS-based communications.

Furthermore, the term "media file" as used herein should be construed as including instructions which may be used to direct a rendering engine as to how a message should be rendered. A user for whom the rendering is to be provided may be allowed to tailor how her messages are to be rendered. For example, a user who initiates a message may receive, as the media file, a stream of musical notes or rhythm. If this user's communication device is adapted with a synthesizer, the received notes or rhythm may be synthesized in various ways for the user, including by using a virtual instrument that has been selected by the user. (For example, the user might specify that audio files are to be rendered as if played by a piano, or perhaps by a trumpet, etc., and that rhythm is to be processed by causing the communication device to vibrate or to display lights on a light bar, and so forth.)

As stated earlier, files to be used with automated responses to e-mail might include executable programs, links to locations or web pages, and so forth, and thus the term "media file" as used herein is intended to include these types of files as well.

The media file that is used for a particular message exchange (telephone call, video phone call, e-mail message, instant message, etc.) preferably indicates contextual information about the intended message recipient. According to preferred embodiments, the contextual information is based on the message recipient's calendar (e.g., entries that are stored for an electronic calendaring system). In alternative embodiments, one or more other factors such as preferences, configuration information, or other contextual information (e.g., weather, current location) may be used instead of calendar entries. And as will be described, these various types of factors may also be used to tailor information that is based on the recipient's calendar.

When the techniques of the present invention are used with telephone systems, the sound files may be used in several ways. If an automated mechanism (such as a voice mail system or answering machine) answers an incoming call, the selected sound may be played to the caller prior to playing the recipient's greeting. Suppose, for example, that a call arrives for an office worker who is on vacation. A sound clip of waves crashing onto a beach might be played to the caller, according to the present invention, prior to playing the office worker's stored announcement saying "Hi, this is Bob. I'm currently on vacation . . . ". The selected sound clip thereby provides contextual information for the caller, which will typically improve the caller's message exchange experience. In an alternative approach, the selected music may be played to the caller as a replacement for the greeting. In yet another alternative approach, the selected music may be blended or mixed with the recorded greeting (i.e., as background music). As another alternative, the music may be played after the recorded greeting.

The inventive concepts disclosed herein may also be used in scenarios where the telephone call is answered by a person, for example by a receptionist or by the intended message recipient, but is temporarily suspended. If the call is placed on hold after it is answered, for example, then music selected according to the techniques disclosed herein may be played to the person on hold until the phone call is taken off hold. Or, if the call is being transferred from one phone to another, music selected according to the present invention may be played for the caller while the transfer is taking place. The techniques of the present invention may also be used in conference call scenarios, where the media file may be rendered for multiple parties of the conference call during the temporary suspension.

When used with video systems, the media files are preferably visual files, but may alternatively be audio files or other types of files, as stated above. Thus, references hereinafter to video systems are in terms of visual files, for purposes of illustration but not of limitation. If a caller using a video system reaches an automated messaging system instead of the intended message recipient, a video file may be selected and played for the caller. Using the vacation example again, a video file might be played showing scenes from the recipient's last vacation in order to set the context for the upcoming "I'm on vacation" announcement. And as discussed above, the video might alternatively be played before a spoken announcement, after a spoken announcement instead of a spoken announcement, or mixed in as background for a spoken announcement. (It is known in the prior art for message recipients to record spoken greetings for subsequent playback. Greetings may also be generated in other ways, for example by speaking only one's name into a spoken greeting prepared by someone else. It may also happen that the greeting is generated in some automated way, and the term "spoken greetings" is intended to include these various approaches. However, it is not known in the art to select greeting enhancements as disclosed herein.)

If the caller using a video system does reach a person, but the call is temporarily suspended as discussed above, a video may be selected according to the inventive concepts disclosed herein and played to the caller until the call is resumed.

The present invention may be used in e-mail systems as well. It is known in the art for e-mail systems to include an "auto-responder" function, whereby an e-mail user may configure his e-mail account to automatically acknowledge incoming e-mail messages by returning a selected response message. This is sometimes referred to as an "I'm away" function, and is commonly used by e-mail users who are temporarily unable to check their incoming mail and wish to notify message senders not to expect an immediate response. Commonly-assigned U.S. patents (Ser. No. 09/670,844, filed Sep. 27, 2000), which is entitled "Calendar Events and Calendar-Driven Application Technique", and U.S. Pat. No. 6,640,230 (Ser. No. 09/671,001, filed Sep. 27, 2000), which is entitled "Calendar-Driven Application Technique for Preparing Responses to Incoming Events", disclose techniques whereby the content of the response message may be programmatically generated. These U.S. Patents are described in more detail below. It is not known in the art, however, to select a media file to accompany (or replace) an e-mail response message based on contextual information of the intended message recipient. The inventive techniques disclosed herein may be used for this contextual selection. Thus, if the auto-responder function is active due to an e-mail user being on vacation, then according to the present invention, a media file with a vacation theme may be automatically attached to (or otherwise included within) the generated response message. Or, if the auto-responder is active because the e-mail user is away from the office due to illness, then a ".wav" file with the sound of someone sneezing might be selected for attachment/inclusion. (Hereinafter, the term "attach" is intended to include attaching files to e-mail messages as well as including files within messages.)

In an IMS environment, an icon may be selected using the techniques of the present invention, and returned as (or with) a response from an intended message recipient. For example, if the intended recipient is not currently available (e.g., he has signed off of his IMS), then an icon representing a stop sign might be returned to the sender. This icon might be attached to a text message that says "Message recipient is not currently available"; or, the icon might be sent without an accompanying message. Similarly, a user might hover the cursor of his computing device over an identifier of someone on his buddy list, and an icon corresponding to that person's current status may be displayed for the hover message.

A number of different approaches may be used in an IMS environment to trigger a greeting/response which is enhanced according to the present invention. In addition to the examples discussed above, other approaches include: attempting to send the user a message, and getting the enhanced greeting/response before actually sending the message; and clicking on the user's identifier when the message sender is not able to send the message.

Audio and/or video information might be presented as an alternative to using icons (or in addition to using icons) to enhance an instant messaging greeting/response.

When instant messaging users are participating in a chat, it may happen that the chat is temporarily suspended for some reason. For example, a participant may be at work, and may choose to suspend the chat when his manager enters his office. The employee might indicate this to his chat partner by clicking on an icon or menu item (or some other mechanism) that would send an icon to the chat partner, indicating the desired message (e.g., a stop sign). Optionally, once the chat partner is informed of the suspension, the system may close the chat windows. Additionally, the system could prevent the chat partner from chatting with the user. This same technique could be used when the user has multiple chat partners.

The prerecorded message played to a caller in the prior art when the intended message recipient is not available is referred to herein as a "greeting". These prior art messages typically comprise a message spoken by that person or generated for that person (e.g., by announcing his name or phone number within a message spoken by a third party; or, a message may be generated by a computer using synthesized speech). The present invention defines techniques for enhancing this greeting. The prerecorded music played while a caller in the prior art is temporarily on hold may be distinguished from a "greeting" per se, and the term "response" is used herein to refer to the present invention's media-based enhancement of the time period while a call is temporarily suspended.

It is known in the art to include music or sound with greetings in telephone message systems. Individuals might record their spoken greeting while a favorite song plays in the background, or after an introductory music clip, and so forth. However, it is not known in the art to select music for enhancing a greeting based on calendar entries or user profiles, as disclosed herein, or to select the music to be played as a response while a call is temporarily suspended, as also disclosed herein. Furthermore, it is not known in the art to provide media enhancements for video communications, e-mail messages, or instant messaging systems using the techniques disclosed herein.

An implementation of the present invention may support media-enhanced greetings (including "empty" greetings, where the media enhancement then serves as a replacement for the greeting), or media-enhanced responses, or both. Thus, references herein to enhanced greetings should be interpreted as applying also to responses unless explicitly stated otherwise or unless implied by the context of the discussion.

For ease of reference, subsequent discussions are primarily in terms of voice systems. It will be obvious how the information discussed may be adapted for other communication systems.

Preferred embodiments programmatically select an appropriate sound file using the intended recipient's calendar information, as stated above. Many calendar entries may represent rather generic, categorical status information such as "in the office", "at lunch", "sick", "do not disturb", or "on vacation". An implementation of the present invention may be adapted for predetermined categories of this type (where the categories may alternatively be referred to as "event types"). Music clips or sounds may be selected for each event type (or for selected ones of the event types), and when that event is in effect, the selected music clip or sound is then used. For example, the "do not disturb" status might be associated with "The Typewriter Song" by LeRoy Anderson. If a call arrives while the recipient's current status, according to his calendar, is "do not disturb", then a clip of this song is played for the caller. The association of particular sounds with particular event types may be done on an enterprise-wide level, when the present invention is used in business settings. Or, individuals may be allowed to select their own sound-to-event type associations. Enterprise-wide selections may be used as defaults, and a capability for overriding these defaults by individuals may be provided.

The association of sounds to event types may also be adapted to using groups of sounds. That is, rather than identifying a particular sound or music clip for each event type, a group of sounds or music clips might be specified, with a particular selection from the group being made for individual messages. As another example, suppose the "on vacation" event type is associated with a group defined as "songs by The Beach Boys". Then, if a message recipient's calendar indicates that this "on vacation" event type is active when a call arrives, a clip of one of the Beach Boys songs may be selected. In a scenario using video files, a group of beach-themed video clips or movies might be associated with the "on vacation" event type, and selections from this group may be made for enhancing greetings that are viewable. The particular manner in which the selection from a group is made does not form part of the inventive concepts of the present invention. For example, a music clip might be selected at random, or algorithmically, or from a sequential ordering based on which clip was played most recently, etc. The groups to be used, and/or the selections making up a particular group, may be determined on an enterprise-wide level, or by individuals. Furthermore, individuals may be allowed to customize the selections within a group (for example, by adding additional choices and/or removing choices).

In addition to, or instead of, associating audio files with predetermined event types, in an optional aspect of the present invention, the supported event types are not limited to predetermined categories. Suppose, for example, that a message recipient's calendar indicates "hiking in the mountains" as part of an "on vacation" calendar entry. In this case, the contextual information more accurately reflects the recipient's status if the selection is the sound of birds chirping (or some other sound that is appropriate for being in the mountains, rather than using beach music). Or, if the calendar entry is "away on business" and it can be determined that the business trip involves air travel, then the selection might be airport sounds (such as planes taking off) or perhaps the song "I'm Leaving on a Jet Plane" by Josh White, Jr. To support these types of "free form" events, an implementation of the present invention may be adapted for "understanding" the meaning of the calendar entries. As one example of how this may be implemented, the system may use natural language processing to understand the meaning of the calendar entries. As another example of how this may be implemented, a table associating words/phases to sounds might be used (such as associating "flight" and/or "airport" with the airport sounds or the Josh White, Jr. song).

Additionally, the calendar system may allow for users to specify a media file and associated preferences (e.g., indicating that the media file should be rendered before the greeting) on individual calendar entries. Preferences might also be used with a calendar entry to indicate how a default media file should be rendered while that calendar entry is in effect. If a media file and/or preferences are specified, then this specified information is preferably used for the duration of the calendar entry.

In alternative embodiments, rather than determining a message recipient's status using stored calendar entries, the sound files to be used under particular circumstances may be specified directly. As an example of using this approach, an individual might specify in his user profile that one music file is to be used during his normal working hours, another music file is to be used during his normal lunch hour, and yet another music file is to be used otherwise. An enterprise might select one set of music clips for its normal operating hours, and a different set for the hours in which it is closed.

An implementation of this embodiment may allow individual and/or enterprise-wide specification of particular files, and/or specification of groups of files, in an analogous manner to that which has been discussed for calendar-based embodiments. In the case of enterprise-wide selections, those selections may be stored in enterprise-level profiles, which may be further refined with departmental profile selections, or other types of profiles. Preferably, these selections which apply to more than one user are made by a person such as a systems administrator, and individual users are allowed to override these selections with their own personal preferences. (An enterprise may choose to restrict the ways in which users can override the enterprise-wide selections. For example, the systems administrator might define a group from which selections can be made, where choices can then be deleted by individual users but extra choices cannot be added.)

In addition to being offered by an enterprise for its internal use (e.g., by its employees), implementations of the present invention may also be offered by service providers to their customers. For example, a telephone service provider might offer the enhanced greeting techniques disclosed herein as a type of upgraded subscription service, or perhaps as a pay-per-use service.

Information regarding the caller (or message initiator) and other sources of state information about the called party (or intended message recipient) beyond an electronic calendar may be used in the media selection process. For example, suppose a user Sam has his instant messaging buddy list arranged into categories including "friends" and "customers". Using techniques of the present invention, Sam may specify that when his calendar shows an "I'm sick" status, instant messaging participants identified in the "friends" category receive a "bio-hazard" icon when sending him an instant message while participants identified in the "customers" category receive an "out of office" icon. Similarly, an e-mail auto-responder system might attach one file for response messages to be returned to one group of users (e.g. having particular e-mail addresses or address patterns) and another file for returning to users not in this group.

As another example, suppose a user Bob has a cell phone service (through his cell phone provider) that provides call screening. This call screening service may allow Bob to categorize callers into groups such as "friends" and "business associates" using their phone numbers. The service may be augmented using the teachings of the present invention such that when a call is received, the service compares the caller's number to the defined categories, checks Bob's calendar and the current location of his handset, and then passes the call either to the handset or to a voice messaging application. (A global positioning system, or "GPS", is one means with which the location may be determined.) Further suppose that Bob has indicated, through techniques of the present invention, that when his calendar indicates he is "at lunch", then callers in the "business associates" category may receive a simple "unavailable" media file whereas callers in the "friends" category receive a media file that is selected according to the type of restaurant in which the handset is located at the time. (If the handset is near "Porky's Diner", for example, then an audio clip of "Porky Pig" may be selected.)

Other types of contextual information may also be used in a properly-adapted implementation of the present invention. A computer mouse and software has been developed in the prior art that detects a user's mood (i.e., by sensing the user's heart rate, physical movement of the mouse, etc.). This type of mood information is an example of contextual factors that may be used by the present invention to select a media file. As another example, if a user's computing system stores preference information such as the user's favorite sports team, programmatic techniques might be used to query an on-line service which tracks team standings; a media selection might then be tailored to how well the user's favorite team is doing.

A system may be adapted for recognizing a set of events and playing appropriate music during these events, even though a calendar user has not specifically entered these events on her calendar, or in an implementation of the present invention that is not based upon users' calendars but on a more general calendar. An example of such a set of events is the events which are normally represented on printed calendars, including holidays such as President's Day, the Fourth of July, and Halloween, as well as traditionally observed days such as Mother's Day and Father's Day. The system might select patriotic tunes for President's Day and the Fourth of July, for example, while selecting the sound of ghosts and ghouls for Halloween. A video selection might be a video clip showing fireworks for the Fourth of July, and parade video clips for President's Day. The user may be allowed to override selections which are provided as defaults, or the user may make her selections in the absence of system-provided defaults.

User profiles may be used to allow message recipients to customize the automated enhancement of their greetings. A user's profile may specify preferences for particular event types, such as specifying choices from among a set of music files in a group that is associated with an event type. Referring again to the group "songs by The Beach Boys", for example, a user might indicate a preference for her favorite ones of these songs. The choices may be manually selected by the user. As an example of manually selecting choices, the user may specify that songs which reflect the user's religious faith are to be played on days which are significant to that religion. The user then preferably identifies these days. (Or, the system may be adapted to deducing such days.)

Rather than manually selecting choices, in an optional aspect, a system may be adapted to recognizing particular event types and tailoring selections for use with those event types according to characteristics of the users, or perhaps according to characteristics of a typical user (with an optional override capability). In effect, the system appears to "understand" the days of the year in this optional aspect.

A system which recognizes event types—such as particular days of the year—as being significant could, for example, select "T'was the Night Before Christmas" for playing on Christmas Eve. Or, a video selection might be a video clip from Tim Burton's "The Nightmare Before Christmas". A selection of this type may be provided as a default for a typical user, allowing individual users to manually override the choice. Or, the system might programmatically detect that this is not an appropriate choice for particular users based on information stored in user profiles (indicating the user's faith, for example).

As another example of how a system might be adapted for recognizing particular days that a user might consider to be significant, the system might recognize days when the moon is in various phases, and then select sounds that correspond to the recognized days. The sound of howling wolves might be selected on days of the full moon, for example. (Techniques for determining information such as the phases of the moon, based on the day of the year, are known in the art and may be queried by an implementation of the present invention.)

One way in which the days of interest to a user in a media selection implementation which is not based on a user's electronic calendar may be determined is to allow the user to manually select those days; another way is to allow the user to select from rules or descriptions which categorize dates. Examples of a rule-based approach include specifying rules such as "all Canadian national holidays", or "all U.S. holidays that fall on a week day", or "when the current temperature in the recipient's locale is above 60 degrees". (Techniques for obtaining current temperatures for particular locations are known in the art and may be queried by an implementation of the present invention.)

While discussions thus far are primarily in terms of "days", this is by way of illustration and not of limitation. Other time periods, such as hours with a particular day, are preferably supported by an implementation of the present invention.

A user may also be allowed to define multiple profiles, or profiles with complex selection criteria. For example, a user might configure four separate profiles which are based around the seasons of the year. One profile might then include "spring-like" selections, to be played during the days which correspond to spring, or perhaps during a selected calendar period preceding the spring season. As another example, the user might define one set of video files for use on Mondays, another set for use on Tuesdays, and so forth, where rules are used to describe the correspondence of the various sets to the appropriate day of the week. Switching from one profile to another may be triggered automatically, e.g., based on entries the user puts on his calendar or based on detecting events such as the first day of spring or the outside temperature reaching 60 degrees (and thus playing the sound of birds chirping, for example). The new profile would then be processed when that date arrives or that event occurs. As another approach, an explicit "change profile" technique might be provided whereby the user indicates (through use of a configuration menu on a computer screen, or by interacting with a configuration menu of a voice mail system, and so forth) that he would like a different profile to be used. (Existing voice mail systems provide a similar option, whereby a user can dial the system and, using a touch tone phone, request the voice mail system to change from using his primary greeting to using an alternate greeting. Similarly, existing e-mail systems provide for selectively activating the auto-responder function and changing the content of its automated response messages. No systems are known to the inventors which provide this approach for profiles that are used to select media files.)

Reference is now made to the accompanying drawings, which will be used to illustrate operation of preferred and alternative embodiments in more detail.

The timelines in FIGS. 1A–1D illustrate use of media to enhance a message exchange process, according to preferred embodiments of the present invention. These figures differ in when the media enhancement is played for the caller, and (by way of example) refer to the media as being a music clip. Each of these figures will now be described.

Figure 1B:
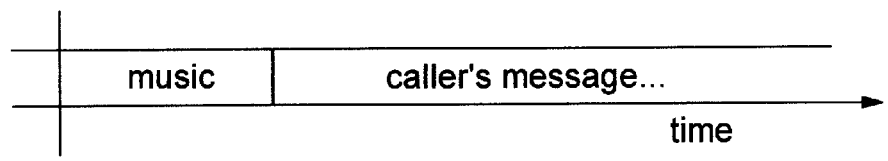
Figure 1C:
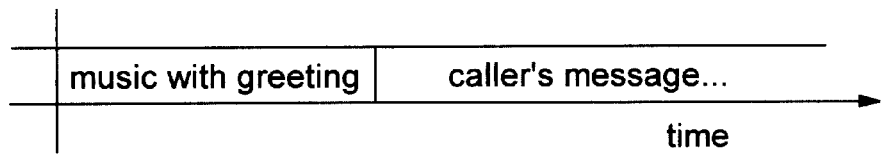

As shown in FIG. 1A, a selected music clip is played when an incoming call is answered by an automated message system. Following the end of the music clip, the intended recipient's greeting is played, and the caller can then record her message. In FIG. 1B, the message recipient's greeting is empty, so that the caller may record her message immediately following the end of the music clip. FIG. 1C shows an example where the message recipient's greeting and the music clip are played simultaneously. As stated earlier, the greeting and media file may be blended or mixed together for this approach. (This blending process may occur dynamically, while answering a particular incoming call. Or, the blending may have been performed in advance, such that the result is already available for playing to the caller. The latter technique may be advantageous, for example, in an implementation built according to the flowchart in FIG. 4 or FIG. 10.) It may be desirable in some situations to render the media following the greeting, although this has not been illustrated in FIGS. 1A–1C.

Figure 1D:
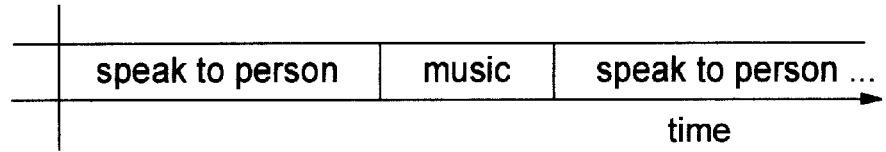

Finally, FIG. 1D shows a selected music clip being played after a call has been answered, while that call is temporarily suspended. Preferably, if the music clip is shorter than the duration of the suspension, the clip will be repeated. Alternatively, multiple clips may be used, if identifications thereof are available.

Figure 2:
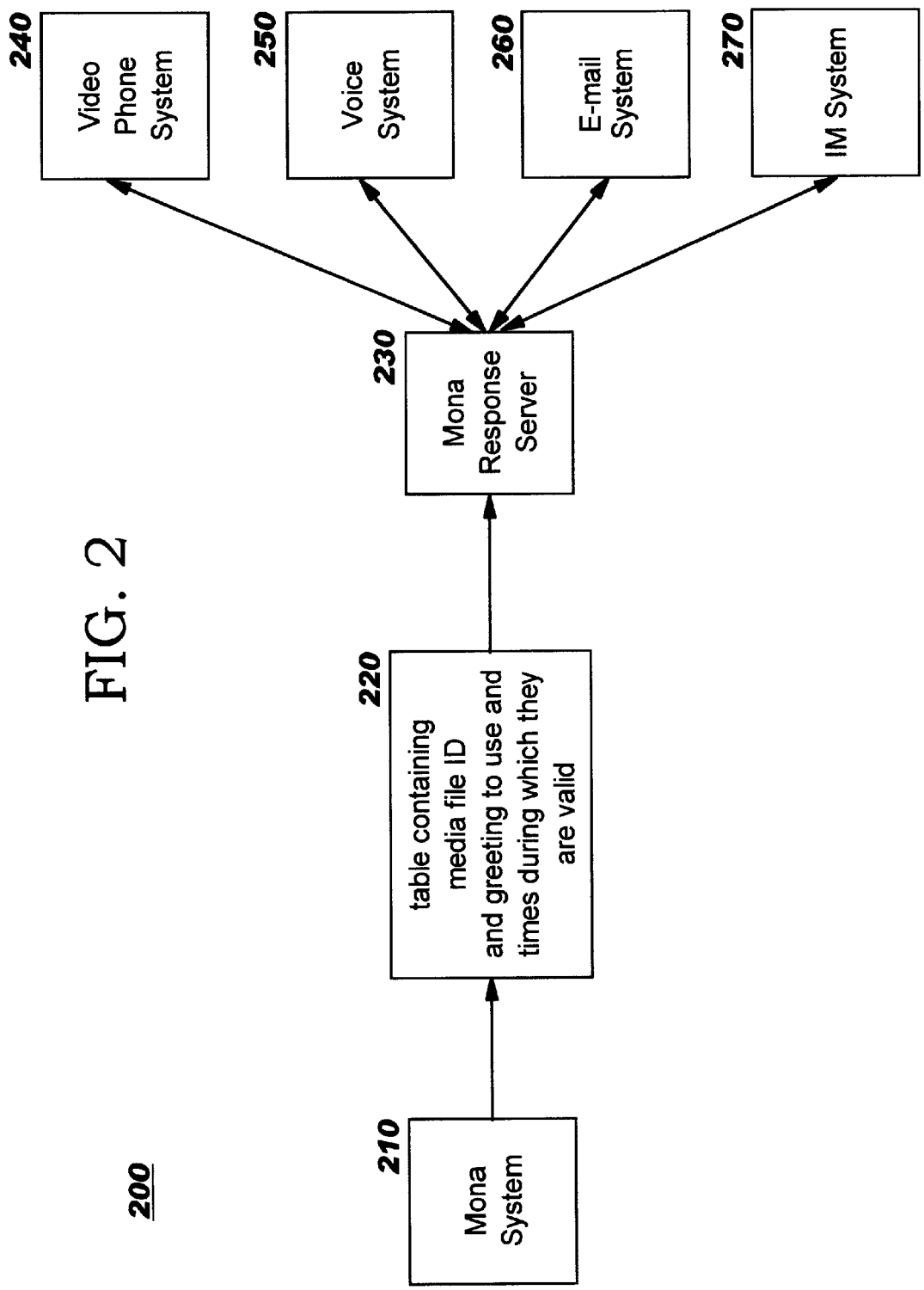
FIG. 2 provides a high-level overview of components which may be used in an implementation of the present invention, and interactions among them.

FIG. 2 provides a high-level overview of components which may be used in an implementation of the present invention, and interactions among them. The components making up the overall system 200 include a component referred to herein as the "Mona system" 210. The Mona system is an advanced calendar-based information system which provides means fin entering, organizing, and processing calendar and user preference information to enable various applications. For example, the Mona system automates the generation of voice mail greetings, using a message recipient's calendar and preferences, such that the greeting remains synchronized with the message recipient's current status (as indicated by the calendar entries). The Mona system is described in the aforementioned commonly-assigned U.S. patents (Ser. No. 09/670,844, filed Sep. 27, 2000), which is entitled "Calendar Events and Calendar-Driven Application Technique", and U.S. Pat. No. 6,640,230 (Ser. No. 09/671,001, filed Sep. 27, 2000), which is entitled "Calendar-Driven Application Technique for Preparing Responses to Incoming Events" which are hereby incorporated herein as if set forth fully. (Note that use of the Mona system for the purposes disclosed herein is not known in the prior art. The techniques of the present invention define new uses for the types of information which may be made available from the Mona system. As will be obvious, the Mona system is not strictly required for an Implementation of the present invention, and references herein to use of the Mona system include other systems which provide the functionality under discussion.)

Returning to the discussion of FIG. 2, the Mona system 210 stores information 220, which for purposes of illustration is referred to as being stored as a table. Preferably, the stored information comprises an identification of one or more media files to be used for a particular message recipient, the greeting(s) to be used for that message recipient, and the times during which those media files and greetings are valid for this recipient. Information from this table 220 is used by a component referred to herein as the "Mona response server" 230. The Mona response server implements techniques disclosed herein to determine which media file and greeting is appropriate at a point in time, and provides that information to communication systems which are interacting with the Mona system. In the example of FIG. 2, the communication systems are a video phone system 240, a voice system 250, an e-mail system 260, and an instant messaging system 270. A particular implementation of the present invention may include one or more of these communication systems (or alternative communication systems).

Figure 3:
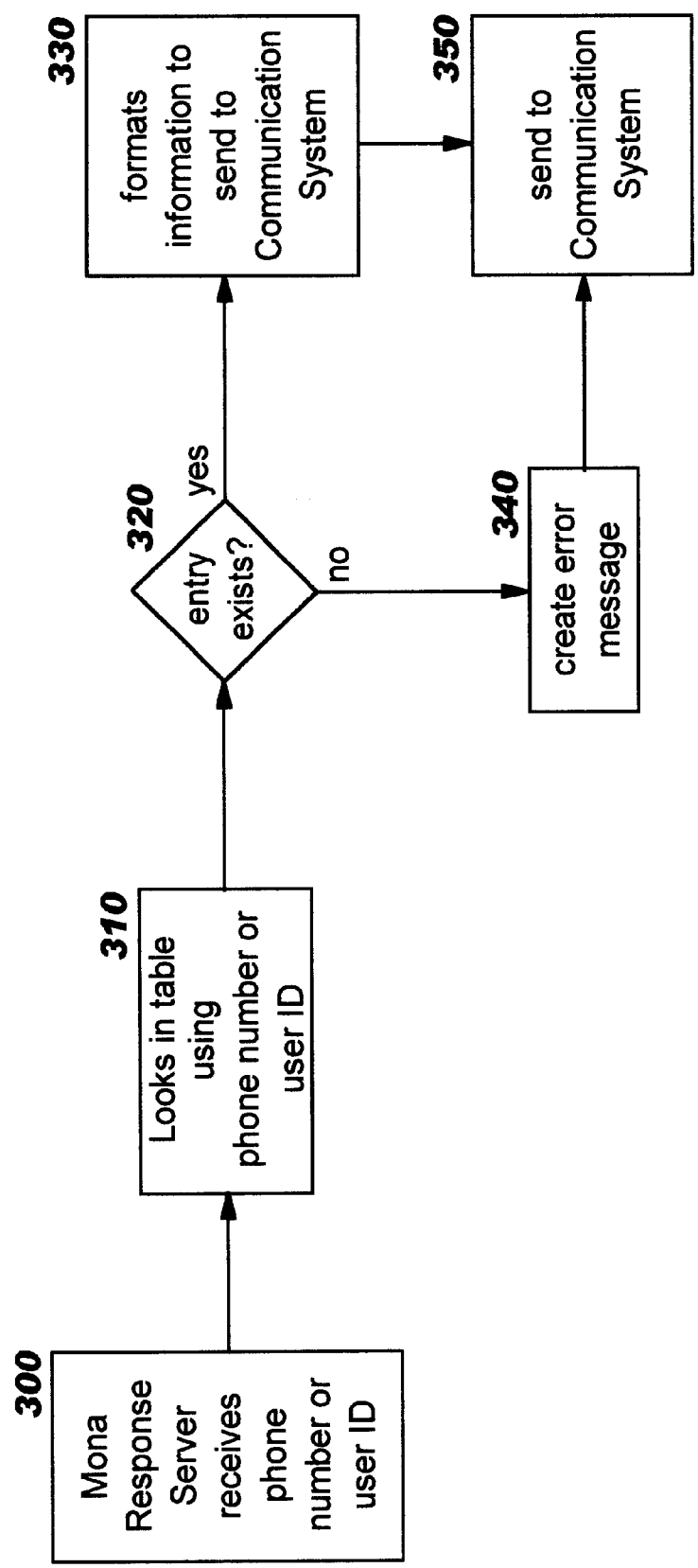
FIG. 3 is a flow diagram illustrating how a message exchange may be enhanced based on a message recipient's electronic calendar, according to preferred embodiments of the present invention.
Figure 4:
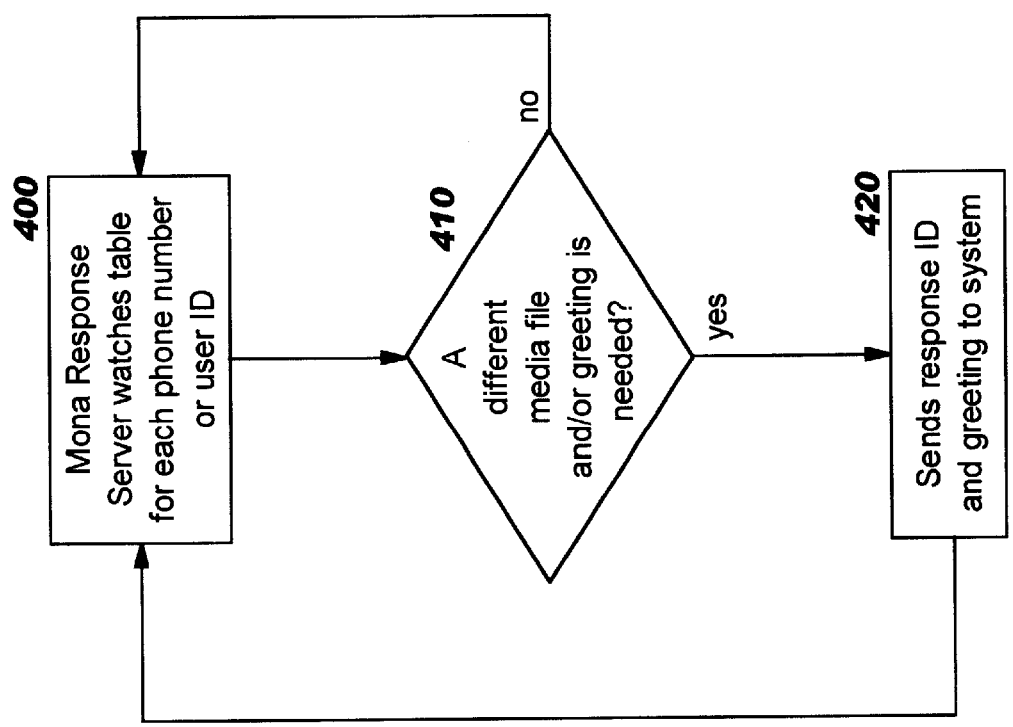
FIG. 4 is a flow diagram illustrating an alternative technique for enhancing a message exchange based on the message recipient's electronic calendar.

Two ways in which the Mona response server 230 may be used to obtain information about which media file and greeting is appropriate, based on a message recipient's electronic calendar, are shown in FIGS. 3 and 4. The approach shown in FIG. 3 is preferably implemented as an "on demand" solution, whereas the approach in FIG. 4 shows an a priori, or "push" model, solution. These approaches will now be described in more detail.

The on-demand process of FIG. 3 is activated upon receipt of an incoming message (see the discussion of FIG. 8, below), from which the Mona response server receives intimation with which the intended message recipient can be uniquely identified (Block 300). For example, this identifying information may be the phone number or user ID of the intended message recipient. Or, this identifying information may be an identifier (or identifiers) such as the person's phone number plus an extension number. This received information is preferably used (Block 310) to access the table which was described with reference to element 220 of FIG. 2, wherein (inter alia) information about the message recipient's calendar is stored.

A sample table is depicted in FIG. 5, and will be described in more detail below. According to preferred embodiments, this table includes entries for time periods for which the message recipient's calendar contains different calendar or status information. A particular entry might span several days (such as an "on vacation" entry), or merely some portion of an hour during a day (when the calendar owner's status is "in a meeting", for example), or several hours, and so forth. If the person's status is "away on business", and the calendar further indicates that he will first be in New Orleans and then continues on to China, for example, different media files and/or preferences might be applicable for these different parts of the business trip. In this case, separate entries are preferably created in the table for each of the destinations. Thus, the processing of Block 310 preferably comprises determining the current date and time, and locating the entry in the table for the current date, and which has a starting time less than or equal to the current time as well as an ending time greater than the current time.

As an alternative to using information stored in a table, it should be noted that the Mona response server may dynamically process the message recipient's calendar entries to ascertain a message recipient's status "on the fly". This has been described in the commonly-assigned patents and U.S. Pat. No. 6,440,230 (Ser. No. 09/670,844 and Ser. No. 09/671,001). Embodiments of the resent invention may therefore be used with this approach as well.

Block 320 checks to see if an entry was found in the table or if the message recipient's current status was successfully determined). If so, then Block 330 formats information to send to the communication system, and that information is sent in Block 350. In preferred embodiments, this information comprises an identifier of a media file and greeting (or an address or other identifier which may be used to retrieve the media file) to be played for the caller. The information may further comprise a specification of whether the media file is to be played before, after, instead of; or blended with, the greeting. (Alternatively, an implementation of the present invention may be adapted for one or the other of these approaches, in which case an explicit specification is not necessary.) Users may be allowed to control the timing of playing the media file by specifying a user preference. The file identifier may be a key for use with a lookup table, as will be discussed further with reference to FIGS. 7A and 7B, or another type of identifier such as a file system locator or URL from which the media file may be retrieved. (As an alternative to sending a file identifier, the media file itself could be sent. However, it is expected that transmitting the identifier will be more efficient.) If the test in Block 320 has a negative result, on the other hand, then an error message is generated or retrieved (Block 340), and the error message is sent in Block 350. (As an alternative to sending an error message, default information might be sent to the communication system.)

Optionally, when selecting a media file that will convey appropriate contextual information, an implementation of the present invention may consider factors such as the current physical location of the intended message recipient, or the current weather at his locale, or whether the message sender is identified as belonging to a particular category, and so forth.

If a file identifier is sent in Block 350, then the receiving communication system uses this identifier to retrieve the corresponding media file, and plays that file with the greeting, using one of the approaches described above (see the description of FIGS. 1A–1C). If an error message is sent, then the processing at the receiving communication system may choose to omit the media enhancement, or to supply a default media enhancement for this greeting.

And as described earlier, the "media file" identifier sent to the caller might be a form of instructions which direct a rendering engine of the calling system as to how to identify the file to be rendered. As examples, in a voice mail system, this may comprise directing the calling party's phone to play synthesized music, whereas in a video phone system, the calling party's video phone may be directed to access a web site where a video selection will be automatically downloaded. In an e-mail system, a media file identifier might be included in an automatically-generated response message, where the e-mail rendering engine then retrieves that file for rendering to the message recipient. And as an example in an IMS, this might comprise sending a URL from which the receiver's browser will automatically download content.

The push model process of FIG. 4 is preferably activated upon occurrence of an event such as popping a delay timer or an update of the table information. As indicated in Block 400, the Mona response server "watches" or monitors the table for occurrence of events, for each separate phone number or user ID represented by table entries (or, for each calendar owner, if a pre-stored table is not used). The test in Block 410 asks whether a different media file is now appropriate for this phone number or user ID. For example, suppose that a user's current status according to her calendar was "at lunch" in a previous iteration of the processing of FIG. 4, but the current iteration detects that her status is now "in the office", and that she has different media files associated with these two different event types. In cases such as this, processing reaches Block 420, where the revised information is sent to the communication system. Preferably, this information comprises an identification of the user to whom this information pertains (e.g., the user's phone number and/or user ID), an identifier of the selected media file, and an identifier of the user's greeting (which may be empty in some cases). The information may further comprise a specification of how the media file is to be played, as discussed above with reference to Block 330 of FIG. 3, and may optionally include the starting and ending times during which this media file and greeting combination are valid. Additional information pertaining to the user's status and/or preferences may also be included.

Upon receiving the information sent in Block 420, the communication system preferably stores that received information for subsequent use in the event of an incoming message arriving for this recipient, where that message will be answered by an automated mechanism of the communication system. (Refer to the discussion of FIG. 10, below, for more information on how the received information is processed.)

FIG. 5 shows a sample table 500 containing information that may be used with embodiments of the present invention to select an appropriate media file. Preferably, this table is constructed by augmenting tables used by the Mona system such that they include fields 550, 560, and/or 570 (and optionally field 580, shown in FIG. 6).

As stated above, in preferred embodiments, this table 500 includes one or more entries for each calendar owner (i.e., each user who provides electronic calendar information). For purposes of the present invention, the calendar owner is referred to as a "message recipient". The rows in the table identify time periods for which the message recipient's calendar contains different status information or calendar events or different values for other factors such as preferences. Preferably, the columns in the table provide an identification of the phone number of this message recipient (see element 510), and/or a user ID of this message recipient (see element 520), along with the starting and ending times (see elements 530 and 540) represented by a particular row.

Columns for one or more different media types are also provided. If an implementation of the present invention supports sound files, then a column 550 for identifying a selected sound file for use during the time period represented by a particular row is preferably included. The identified sound file may be one selected by the message recipient. Alternatively, a default sound file might be identified, or an enterprise's default selection might be identified. Or, as discussed above, the identifier might identify a set of sound files, with a particular one to be selected upon receiving a message that is answered by an automated mechanism.

In the sample table 500, media file identifiers are represented using numeric values. These numeric values refer to entries in another table, which is illustrated by the examples in FIGS. 7A and 7B. This approach typically reduces the amount of space required for table 500, and removes redundant information. Alternatively, however, the information in FIG. 7A or 7B might be included directly in the table 500 without deviating from the scope of the present invention.

A column 560 for identifying video files, and/or a column 570 for identifying icons, is preferably included in table 500 if an implementation of the present invention supports video and/or icons, respectively. Values in these columns are analogous to those described for column 550.

If an implementation of the present invention is adapted for processing preferences or other factors instead of calendar events or the status of the user, then the table entries may be different than those shown in the examples. For example, suppose the user's preferences are based on the weather (such as playing "Let it Snow, Let it Snow, Let it Snow" when the temperature is below 32 degrees). Then, the table might only include a single row for each user, indicating the current status information (e.g., the current temperature) and user preferences, where the values in the rows are then updated periodically to account for changes in the temperature. Or, rather than using a table, this type of information might be dynamically obtained, upon receipt of an incoming message.

FIG. 6 shows a sample table 600 that is similar to that of FIG. 5, but is augmented with status information (see column 580) about users who may receive incoming messages. As illustrated by the sample table 600, the status 580 may be a textual description of the message recipient's status during the time period represented by the row. (Numeric values might be used instead of textual information for representing status 580.)

As discussed briefly above, FIGS. 7A and 7B provide sample tables 700, 750 that may be used to define a correlation between a media file ID (or the ID of a group of files) and a descriptive title thereof, and a correlation between the ID and the location(s) of the identified media file(s), respectively. In the sample table 700, for example, the response ID "21" of the first row is defined as representing "office sounds". By reference to the first row of table 500 of FIG. 5 (and of table 600 of FIG. 6), it can be seen that this same response ID "21" is associated with the entry for a particular user between 9 and 10 a.m. on Dec. 21, 2001. Thus, during this one-hour time period, selections from "office sounds" are to be played to enhance the user's greetings when receiving incoming telephone calls. Column 580 of FIG. 6 further indicates that during this one-hour hour time period, the user is in a "teleconference" status.

The second row of table 700 shows a response title of "Jazz-general". This is an example of specifying a group of music clips, where the user does not explicitly pick a particular selection. Techniques for making a selection from a group have been described above, and include random selection, algorithmic selection, etc. While a selection might be made by the Mona response server (see Block 330 of FIG. 3, for example), the selection is preferably made by the communication system which will supply the media file. In this manner, the communication system can keep track of which group members have been selected, how many times they have been selected, or other types of criteria which may be important for an implementation of the present invention. (For example, if selections are retrieved using a pay-per-download model, it may be useful to gather information about the selections and retrievals.)

The status information in column 580 may be used to select a media file, instead of using the ID values in columns 550–570, or in combination with those ID values (e.g., as a means of fine-tuning the selection within a group such as "Jazz-general").

Referring now to FIG. 7B, the sample table 750 shows how media files may be located. A correlation is defined between a media file ID and its location. The second row of this table, for the file having ID "21", represents the same information as the first row of table 700 in FIG. 7A. That is, the "office sounds" file's location is specified in this entry, and is shown in the example as "/usr/sounds/office21.wav". The third row of table 750 shows one way in which groups of media files may be located. Here, the "Jazz-general" group identified with ID "77" is specified as having two different ".wav" files. Referring back to tables 500 and 600, it can be seen that the "Jazz-general" group has been specified for use between 10 a.m. and 5 p.m. (i.e., 17:00) for the user having phone number "555-444-3333" and user ID "jdoe@myco.com"; this time period also has the status "free time in office" (see FIG. 6). The final row of table 750 illustrates another option for selecting a media file, whereby a streaming media source such as a radio station is identified as the source of the media file identified using the number "893". (As stated earlier, media file selections may include sources such as television broadcasts, taped programs, and so forth.)

Note that the information represented in FIGS. 7A and 7B might be combined into a single table in an implementation of the present invention.

Figure 8:
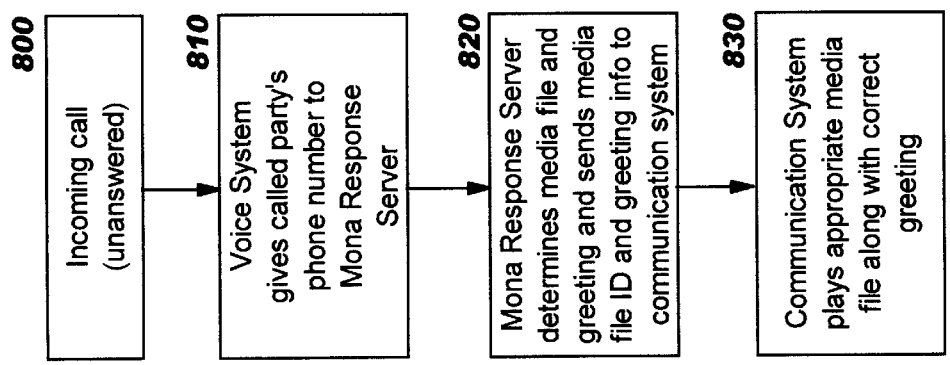
FIG. 8 provides a flowchart depicting logic with which preferred embodiments may implement media file enhancement of incoming messages which are answered by an automated communication system.
Figure 9:
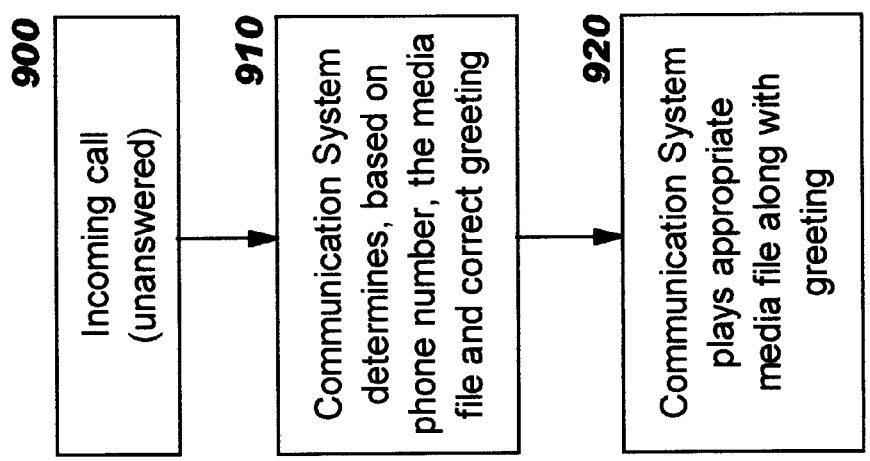
FIGS. 9 and 10 provide flowcharts depicting logic which may be used as alternatives to the technique depicted by FIG. 8.
Figure 10:
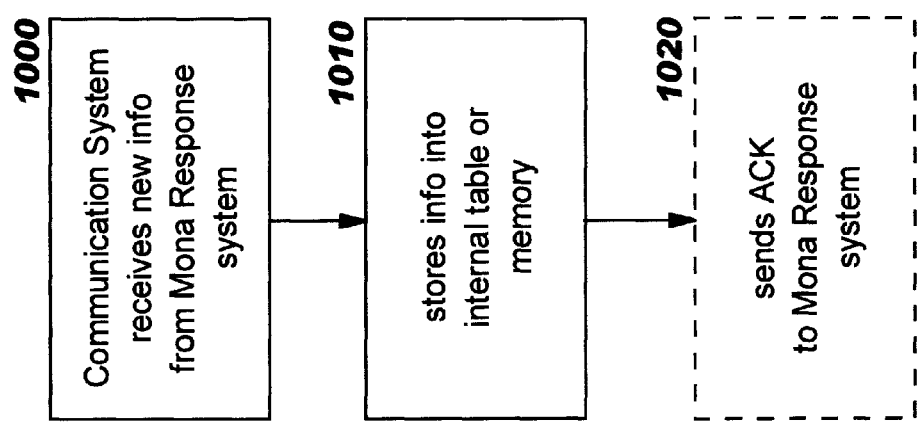

FIG. 8 provides a flowchart depicting logic with which preferred embodiments may implement media file enhancement of incoming messages which are answered by an automated communication system, and FIGS. 9 and 10 provide flowcharts depicting logic which may be used as alternatives to the technique depicted by FIG. 8. These various approaches will now be described.

In FIG. 8, a preferred calendar-based embodiment is depicted wherein an incoming message (described as a phone call for purposes of illustration) arrives (Block 800), and is unanswered by the intended message recipient. Thus, an automated system takes the call, and as shown at Block 810, delivers the called party's phone number to the Mona response server. In Block 820, the Mona response server determines the particular media file and greeting to be used for this call, based on the message recipient's current status. (Refer to the discussion of FIG. 3, where the processing performed by the Mona response server has been described.) This information is then sent (as discussed with reference to Block 350 of FIG. 3) to the automated communication system which is handling the call. When the selected media file and greeting information have been received, the communication system plays them (Block 830) for the caller. Refer to the discussion of FIGS. 1A–1C for various ways in which this playback may occur. As noted with reference to those figures, the caller then typically leaves a message for the intended message recipient. (Alternatively, of course, the caller might decide not to leave a message.) The processing of FIG. 8 for this incoming call is then complete.

The logic in FIG. 9 may be used in an alternative embodiment of the present invention which selects a media file according to one or more factors other than electronic calendar information. Examples of these factors have been described, and include a user profile, current weather, and so forth. For ease of reference, FIG. 9 is described in terms of using user profiles. An incoming message (e.g., a telephone call) arrives (Block 900), and is unanswered by the intended message recipient. The automated system therefore takes the call, and as shown at Block 910, the communication system augmented according to the present invention then determines the particular media file and greeting to be used for this call, based on the message recipient's user profile. (As indicated in Block 910, the called party's phone number may be used as a lookup key to find the appropriate user profile. Alternatively, the lookup key might be determined from the phone number, for example using hashing techniques which are known in the art. Other identifiers that are supported by the system may be used instead of, or in combination with, the phone number and/or e-mail address to identify the recipient's data.) Upon determining the media file and greeting, the communication system plays them (Block 920) for the caller, who may choose to leave a message using the communication system. The processing of FIG. 9 for this incoming message is then complete.

The logic in FIG. 10 depicts a push model for delivering information for use with the present invention. This logic may be used in a calendar-based embodiment of the present invention, and is preferably used as a counterpart to the logic shown in FIG. 4. FIG. 4, discussed above, illustrates how the Mona response server may periodically determine that a different media file and/or greeting is needed for one or more users, and sends that information to the appropriate communication systems. The logic in FIG. 10 shows how that information may be processed upon receipt by the communication system. As shown at Block 1000, the new information is received from the Mona response server, and is preferably stored into an internal table or memory (Block 1010). As discussed earlier, this information preferably comprises an identification of the user, the media file, and the user's greeting, along with information about how to play the media file and greeting, and possibly the time period in which this combination is valid. Other information pertaining to the greeting may also be sent.

Optionally, an acknowledgement may be returned to the Mona response server (Block 1020), for example to improve reliability of the system.

Note that while memory may be used for storing the received information, it is preferable to use a more permanent type of storage such as a table that is persisted to a disk file or other type of non-volatile storage.

In this push model, the communication system has information locally available for answering incoming calls (or call suspensions) according to the present invention. The information may be sent to the communication system using several approaches. As a first approach, the information for an enterprise's users may be distributed to the communication system(s) at the start of each day, with revised information being distributed as needed. As a second approach, the combination of media file and greeting to be used at a particular point in time may be distributed, along with an indication of when to change to something different. As a third approach, the combination of media file and greeting to be used for a particular time period may be distributed, followed by a subsequent distribution of revised information before the end of that time period.

It may happen that the communication system experiences an outage of some type, resulting in unavailability of the necessary information. For example, a network failure might occur while revised information is being transmitted according to the processing of Block 420 of FIG. 4. If the communication system does not have the information it needs for handling an incoming call, it may use a default media file (for example, an enterprise-wide selection when an individual's override has been lost somehow), or may simply omit use of the media file. As another approach, an implementation of the present invention may optionally choose to provide failure handling logic. The acknowledgement sent in Block 1020 may be used in this option, whereby the Mona response server is adapted for expecting to receive the acknowledgement, and periodically retransmitting revised information if the acknowledgement fails to arrive within a predetermined time interval.

The receiving communication system may also be adapted for requesting delivery of revised information when it detects a problem. For example, if the time period in which the combination of media file and greeting is valid has expired, but no revised information has been received, then the communication system may issue a request to the Mona response server for the revised information. Although this has not been illustrated in the drawings, it will be obvious to one of ordinary skill in the art how this recovery protocol can be implemented.

Commonly-assigned (Ser. No. 09/941,045, filed Aug. 28, 2001), which is entitled "Calendar-Enhanced Awareness for Instant Messaging Systems and Electronic Status Boards" and is hereby incorporated herein by reference, discloses (inter alia) techniques for automating a user's instant messaging status, and discusses retry/recovery mechanisms that may be used in an IMS scenario. Refer to this patent for more information on retry/recovery techniques, which may be adapted for use with the present invention.

Figure 11:
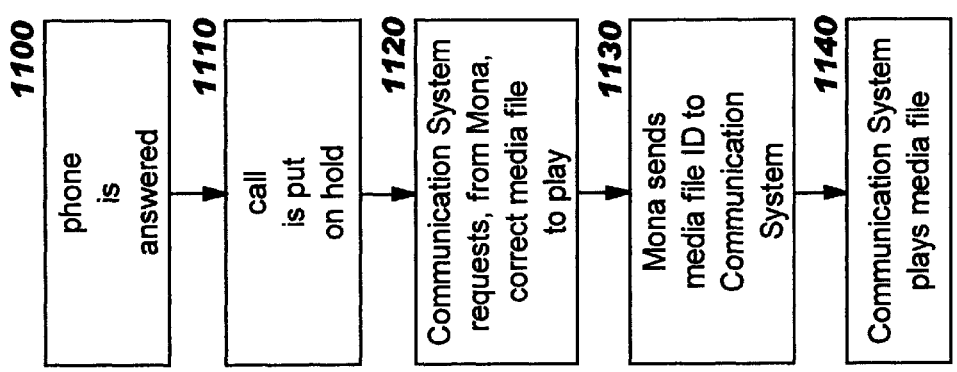
FIGS. 11 and 12 provide flowcharts depicting logic with which embodiments of the present invention may implement media file enhancement of responses which are used when a message answered by a person is temporarily suspended.
Figure 12:
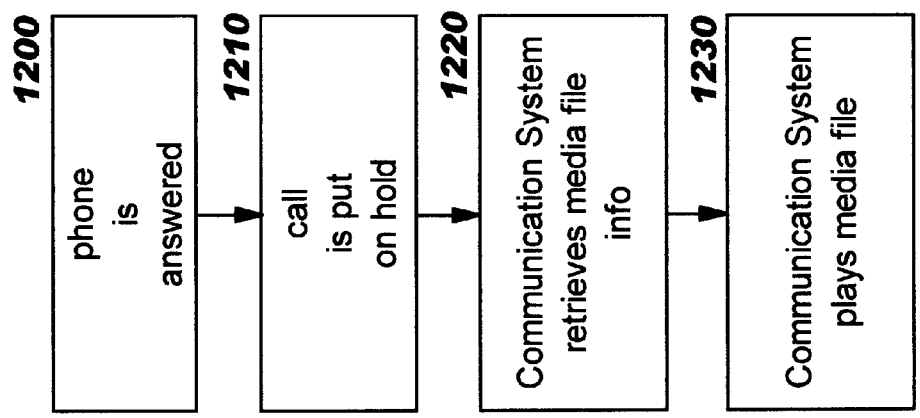

Turning now to FIGS. 11 and 12, flowcharts are provided which depict logic with which embodiments of the present invention may implement media file enhancement of responses which are used when a message answered by a person is temporarily suspended. The logic in FIG. 11 may be used in a calendar-based embodiment, and the logic in FIG. 12 may be used in an alternate embodiment which selects a media file using other factor(s) such as a user's profile.

In Block 1100, the incoming message (described in the figure as a call) is answered by a person, and in Block 1110, the call is then put on hold (or otherwise suspended, for example by transferring the call to another number). The communication system then requests (Block 1120), from the Mona system, an appropriate selection to play during this call suspension period. The selection may be identified by a numeric ID, as shown in the tables in FIGS. 7A and 7B, by way of example, and preferably represents the called party's current status as indicated by her calendar entries. The Mona system determines that current status, and from it deduces the correct sound (preferably by accessing a row from a table such as table 500 of FIG. 5 or table 600 of FIG. 6). An identifier of the selected media file is therefore communicated (Block 1130) to the communication system, which then plays the media file (Block 1140), as represented by the timeline in FIG. 1D.

In the alternate approach of FIG. 12, an incoming call is answered (Block 1200) by a person, and is then put on hold (Block 1210). Block 1220 then determines the appropriate sound by consulting one or more other factors such as a user profile. When using a user profile, the user profile is preferably located using the telephone number or other identifier of the called party, and a selection is identified using that located user profile. The selected media file is then played (Block 1230), preferably until such time as the call is resumed, as has been described with reference to FIG. 1D.

Note that either party to the exchange might initiate the call suspension. (And in a conference calling scenario, any party to the conference call might put the call "on hold".) Thus, an implementation of the present invention may be adapted for consulting the calendar (as shown in FIG. 11) or contextual factors (as shown in FIG. 12) of a party initiating the call suspension, rather than information pertaining to the called party.

As has been demonstrated, the present invention provides advantageous techniques to alleviate disadvantages of distance communication, conveying contextual information to message senders. The disclosed techniques may enhance the enjoyment and productivity of using various types of communication systems, and also enable new methods of doing business (e.g., by merchandising media files).

While some prior art voice mail and telephone systems allow users to provide personalized greetings, and some allow selecting the music to be played, the disclosed techniques provide for much more user-specific control. (For example, an enterprise typically controls which music is played to its on-hold callers; the present invention defines techniques for user-specific media selections to be provided in an automated fashion.) The additional meaning available through the media-enhanced messages created according to the present invention conveys beneficial contextual information to message senders.

Commonly-assigned (Ser. No. 09/782,773, filed Feb. 13, 2001), which is entitled "Selectable Audio and Mixed Background Sound for Voice Messaging System", discloses techniques for a calling party who leaves a voice message to select background sound that he would like to have for that particular message, and also discloses techniques for a calling party to select background sound to be used during a telephone conversation. This is in contrast to the present invention, which selects media files from the perspective of the called party. In addition, this commonly-assigned patent does not disclose techniques for using information from electronic calendars, as has been disclosed herein.

The techniques disclosed herein may be adapted for use with the calling-party approach of this commonly-assigned patent. In this adaptation, the calling party's calendar would be used for selecting background sound to be included with the caller's message (or inserted into the caller's message). For example, if Joe makes a call from Tahiti on his cell phone while he's on vacation, the selected sound might be the sound of waves; or, when he places calls during a full moon, the selected sound might be the sound of wolves howling. The commonly-assigned patent discusses conveying emotion as a primary motivating factor for inclusion of sound into the caller's message. User preferences may be used as disclosed herein to select an appropriate sound or media file. For example, the caller might specify a preference for "bah humbug" types of sounds during the Christmas holiday season to send a message conveying his emotions.

For an adaptation to a calling-party scenario, the caller's telephone or telephone system is preferably adapted to query the calling party's Mona system, in a similar manner to that which has been described herein for the called party (including the option to receive periodic updates, as discussed herein; see also the commonly-assigned Ser. No. 09/941,045, which discusses the periodic update technique). When the caller is using a cell phone in the calling-party adaptation, the user would need to connect to the Mona system and download revised information periodically in order to maintain current contextual information; preferably, notifications will be sent to the cell phone when an update is required.

Instant messaging clients in the prior art have the ability for a user to specify a message that is automatically sent to people attempting to contact the user. These messages are typically very basic. The previously-discussed (Ser. No. 09/941,045, filed Aug. 28, 2001) discloses techniques for automating this process, but does not teach adding personalization to the greeting, which has been disclosed herein.

Video phones also have similar ways for one to record a greeting, which may be a video greeting. However, these greetings are not automatically generated (and do not reflect the user's current status as reflected by her electronic calendar).

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or flow diagrams of methods, apparatus (systems) and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or flow diagram block(s) or flow(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus.

While preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

We claim:

1. A method of enhancing message exchanges, further comprising steps of:

receiving, from a message initiator, an incoming message for an intended message recipient, where the intended message recipient does not answer the incoming message;

programmatically determining a current context of the intended message recipient;

programmatically determining a greeting to be automatically returned to the message initiator in response to the incoming message based on the programmatically-determined context;

programmatically selecting a media file, based on the programmatically-determined context;

blending the programmatically-selected media file with the programmatically determined greeting; and returning the blended media file and greeting to the message initiator.

2. The method according to claim 1, wherein the step of programmatically determining the current context further comprising comprises the step of programmatically consulting the intended message recipients electronic calendar to determine his current status.

3. The method according to claim 1, wherein:

a correspondence between the media file and the programmatically-determined context has been specified by the intended message recipient; and the programmatically selecting step further comprises using the specified media file.

4. The method according to claim 1, wherein:

a correspondence between a group of media files and the programmatically-determined context has been specified by the intended message recipient; and the programmatically selecting step further comprises choosing the selected media file from the specified group.

5. The method according to claim 1, wherein:

a correspondence between the media file and the programmatically-determined context has been specified by an enterprise; and the programmatically selecting step further comprises using the specified media file.

6. The method according to claim 1, wherein the media file corresponding to the programmatically determined context is identified using a unique identifier.

7. The method according to claim 1, wherein the programmatically selected media file is identified using a location of the media file, and further comprising the step of retrieving the programmatically-selected media file from the identified location.

8. The method according to claim 7, wherein the programmatically-selected media file is a radio broadcast and the location identifies a radio station.

9. The method according to claim 7, wherein the location is a Uniform Resource Locator ("URL").

10. The method according to claim 7, wherein the retrieving step further comprises requesting the programmatically-selected media file from a pay-per-use service.

11. The method according to claim 1, wherein the programmatically selected media file is a stream and the blending step blends the stream with the programmatically determined greeting.

12. The method according to claim 1, wherein the programmatically-selected media file is computer generated.

13. The method according to claim 1, wherein;
the current context of the intended message recipient is indicated by a calender event scheduled on an electronic calendar of the intended message recipient and
the programmatically selecting step uses an automated understanding of calendar events to determine the media file to be selected.

14. The method according to claim 1, wherein the programmatically selecting step further comprising the step of programmatically consulting the intended message recipient's user profile to determine the selected media file to be selected.

15. The method according to claim 1, wherein the programmatically selecting step further comprises the step of selecting a particular media file if the message initiator belongs to a predetermined category of message initiators and selecting a different media file otherwise.

16. The method according to claim 1, wherein the step of programmatically determining the current context further comprises the step of programmatically consulting information about the intended message recipient's location or locale.

17. The method according to claim 1, wherein the incoming message is an e-mail message.

18. The method according to claim 17, wherein the returning step further comprises returning the blended media file and greeting to message initiator in a second e-mail message.

19. The method according to claim 17, wherein the returning step further comprises returning the blended media file and greeting to the message initiator in an instant mail message.

20. The method according to claim 1, wherein the programmatically-selected media file is an executable program.

21. The method according to claim 1, further comprising steps of:
requesting, from a media file merchandising system, the programmatically selected media file;
providing the requested media file, by the media file merchandising system, responsive to the requesting step and prior to the blending step; and
charging a fee for the provided media file.

22. The method according to claim 1, wherein the message initiator is a caller using a telephone.

23. The method according to claim 1, wherein the message initiator is a caller using a video phones phone.

24. The method according to claim 1, wherein the message initiator is a message sender using an instant messaging system.

25. The method according to claim 1, wherein the message initiator is a message sender using an e-mail system.

26. An apparatus for enhancing message exchanges by blending a selected media file with a greeting for rendering to a message initiator in response to a message from the message initiator to an intended message recipient who does not answer the message, wherein the greeting conveys recipient-specific contextual information pertaining to the intended message recipient and wherein the selected media file is selected based on the recipient-specific contextual information.

27. The apparatus according to claim 26, wherein the intended message recipient's electronic calendar is consulted to determine the recipient-specific contextual information pertaining to the intended message recipient.

28. The apparatus according to claim 26, wherein the selected media file is identified using a location thereof, and wherein the selected media file is retrieved from the identified location.

29. The apparatus according to claim 28, wherein the selected media file is a television broadcast and the location identifies a television station.

30. The apparatus according to claim 28, wherein the selected media file is a stream.

31. A computer program product for enhancing message exchanges the computer program product embodied on one or more computer-readable media and comprising:
computer-readable program code means for receiving, from a message initiator, an incoming message for an intended message recipient, where the intended message recipient does not answer the incoming message;
computer-readable program code means for consulting an electronic calendar of the intended message recipient to determine the intended message recipient's current context;
computer-readable program code means for determining a greeting to be automatically returned to the message initiator as a response to the incoming message;
computer-readable program code means for programmatically selecting a media file corresponding to the current context;
computer-readable program code means for blending the programmatically-selected media file with the greeting; and
computer-readable program code means for returning the blended media file and greeting to the message initiator.

32. A method of enhancing message exchanges the method comprising steps of:
initiating, by a message initiator, an inbound message for a message recipient, where the message recipient does not answer the inbound message;
deciding, by the message initiator, to record a message from the message recipient, responsive to the message recipient not answering the inbound message;
programmatically obtaining current contextual information pertaining to the message initiator, responsive to the message recipient not answering the inbound message;
programmatically selecting a media file based on the programmatically-obtained contextual information; and
blending the selected media file with the message initiator's recorded message.

33. The method according to claim 32, wherein the step of programmatically obtaining the contextual information anther comprises the step of consulting is the message initiator's electronic calendar.

* * * * *